INVENTOR.
WILLIAM M. POSCHMAN II
BY HIS ATTORNEYS
HARRIS, KIECH, RUSSELL & KERN

Nov. 23, 1965 W. M. POSCHMAN II 3,219,269
BILLING METER
Filed Oct. 21, 1963 2 Sheets-Sheet 2
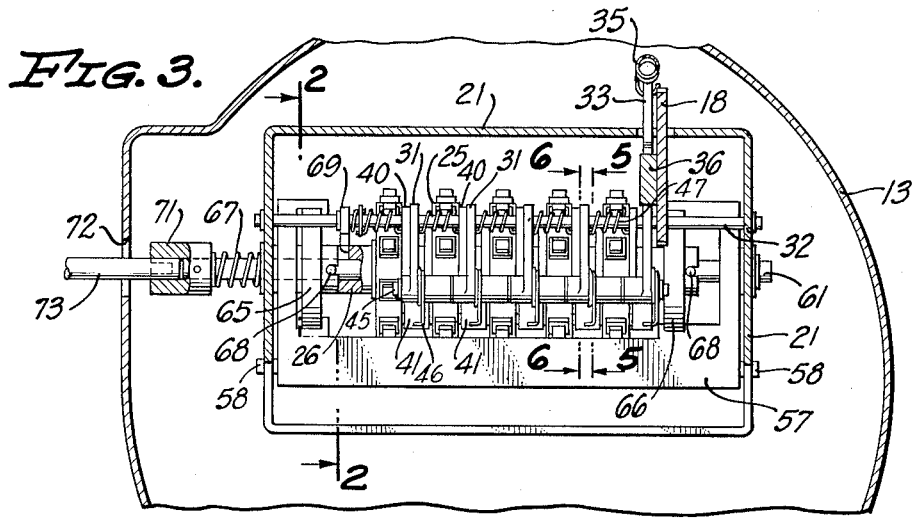
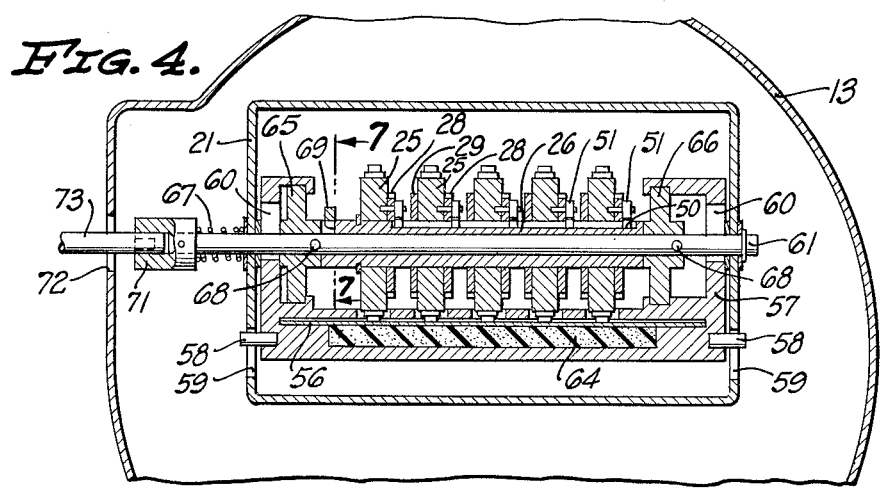
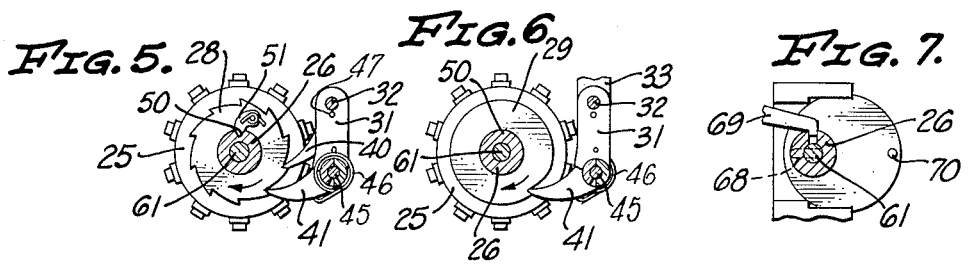
INVENTOR.
WILLIAM M. POSCHMAN II
BY HIS ATTORNEYS
HARRIS, KIECH, RUSSELL & KERN 3,219,269
BILLING METER
William M. Poschman II, 2133 Industrial Road,
Las Vegas, Nev.
Filed Oct. 21, 1963, Ser. No. 317,722
3 Claims. (Cl. 235—58)

This invention relates to recorders for meters and the like and, in particular, to a recorder which will permit direct billing of metered quantities.

The recorder of the invention is suitable for use with any type of metering device, particularly consumption-type meters which indicate volume of gas or water used or watt hours of electrical energy used. The invention will be described herein as used with an electric watt hour meter but it will be clear that the invention is equally applicable to other types of meters.

In a typical electric power metering operation, each residence has a watt hour meter which includes a calculating device providing a continuous total of energy consumed in the form of a visual indication on a set of dials. Periodically, the dial indication is noted by a meter reader and written into a record book. The consumption since the previous reading is obtained by subtracting the previous reading from the present reading and the monetary charge is determined by multiplying the consumed quantity by the rate. A bill is printed and mailed to the customer. The customer either mails in the payment or makes the payment in person at an office.

It is an object of the present invention to provide a new billing meter which will eliminate the visual reading of the meter, the requirement for writing down the reading and making the subtraction, and the calculation of the sum due. The present invention may be utilized to eliminate the mailing of statements to the customers as the company meter reader may deliver the billing at the time of reading. The present invention may also be utilized to eliminate the requirement of a company meter reader and the mailing of the statement to the customer by having the customer perform the reading function.

It is an object of the invention to provide a recorder for a meter which provides a direct and permanent record of the amount due since the previous billing. A further object is to provide such a recorder which may be operated by a meter reader. A particular object is to provide such a recorder which may be built directly into new meters or which may be substituted in existing meters for the present calculator and indicating dials.

It is an object of the invention to provide a recorder including a calculator driven by a meter and having marker means for making a record on a card or other form, reset means for resetting the calculator to an initial condition, transport means for moving the record card and the marker means into engagement to make the record on the card, and an actuator for sequentially actuating the transport means to engage the card with the marker means and actuating the reset means to reset the calculator to the initial condition.

It is a further object to provide such a recorder which may be manually actuated by means of a key or similar device operated by the meter reader. An additional object is to provide such a recorder which may be totally enclosed within a cover and including means for exposing a slot in the cover for insertion of the record card prior to the printing or punching operation.

In a typical installation, the party making the record may insert his key into the device and turn it a first time to uncover the card slot, then insert the card and turn the key further to make a record on the card, after which the key motion is reversed to permit removal of the card and to cover the slot. The key is pushed further in and turned again to reset the calculator to the zero or initial condition, after which the key is removed. Following one system, a meter reader for the company may make the record and carry the card to the office for further processing, after which the card or a copy may be sent to the customer as the statement. Alternatively, the bill may be delivered to the customer at the time of reading, saving postage and time. In another possible mode of operation, the customer may make the record and forward same to the company with the payment indicated on the card.

It is a particular object of the invention to provide a recorder for a meter having an output shaft and including a frame, a calculating mechanism mounted in the frame and including means for engaging the output shaft, a plurality of card markers, means for advancing the markers from a reference condition as a function of output shaft motion, and means for resetting the markers to the reference condition, a card receiving means, and actuating means mounted in the frame in driving relation with the card receiving means for moving the card receiving means toward the markers to engage a card with the markers and including means for engaging the resetting means to reset the markers after engaging a card therewith.

A further object is to provide such a recorder including an actuating shaft mounted in the frame for both rotation and translation, a cam on the shaft for engaging and moving the card receiver toward and away from the markers, another cam on the shaft for engaging the resetting means, and means for selectively engaging the shaft with the cams for first rotating one cam to engage the record card and the markers, then sliding the shaft to engage the second cam and rotating the shaft to reset the calculator. A particular object is to provide such a structure in which the resetting cam is a sleeve mounted on the actuating shaft and the markers are rotatably carried on the resetting sleeve.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:

FIG. 3 is a partial sectional view taken along the line 3—3 of FIG. 1 showing the shaft in the position of FIG. 2;

FIG. 4 is a partial sectional view taken along the line 4—4 of FIG. 2;

FIG. 5 is a mirror image of the sectional view taken along 5—5 of FIG. 3;

FIG. 6 is a sectional view taken along the line 6—6 of FIG. 3;

FIG. 7 is a sectional view taken along the line 7—7 of FIG. 4; and

Figure 1:
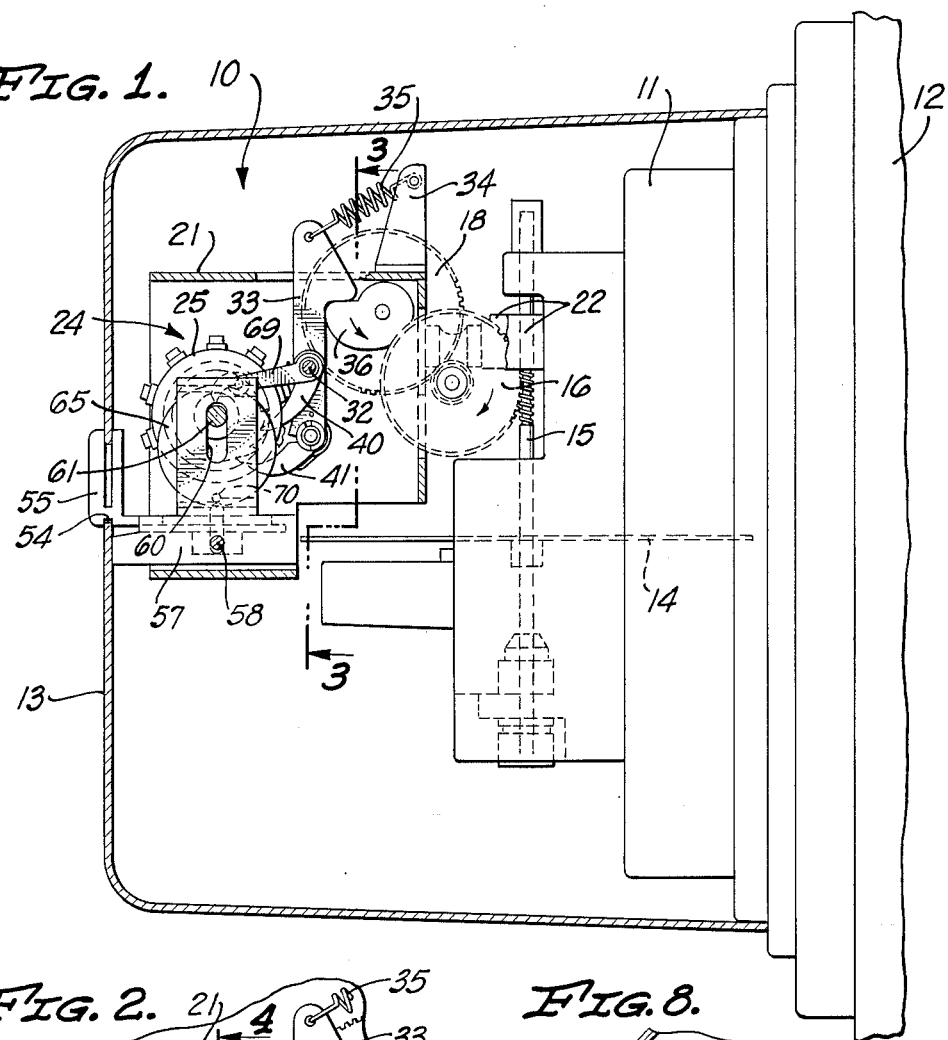
FIG. 1 is a side view partly in section, showing the recorder in conjunction with a meter, with the actuating shaft in the zero or normal position.

In FIG. 1, the recorder 10 is carried on a conventional watt hour meter 11 which in turn is mounted on a wall 12, the recorder and meter being enclosed by a cover 13. The meter 11 is conventional in construction and includes a disc 14 driving a shaft 15 which in turn drives a gear 16 through a worm on the shaft. The gear 16 is on a common shaft with another gear which drives a gear 18 of the recorder, transferring the output of the meter to the recorder.

The recorder itself may be contained in a box frame 21 mounted on bosses 22 and may be built integral with the meter 11 or be designed to be directly substitutable for the conventional numerical indicating dials.

The recorder includes a counter or calculator 24 for converting the motion of the input gear 18 to a form suitable for recording by printing or punching or the like. The calculator may be conventional in design and one typical form is illustrated herein. A plurality of marker wheels 25 is rotatably mounted on a sleeve 26 (FIG. 4). The periphery of each wheel 25 carries a plurality of equally spaced marking indicia, typically the Arabic numerals 0–9, although other number systems such as binary may be used if desired. Each marker wheel carries a ten-notched disc 28 on one face (FIG. 5) and each marker wheel except the highest order carries a single-notched disc 29 on the opposite face (FIG. 6).

Figure 2:
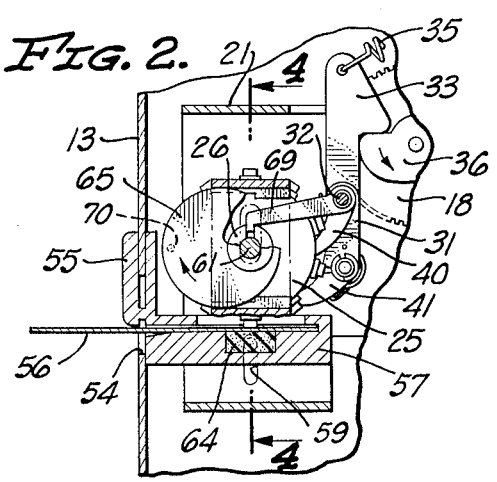
FIG. 2 is a partial sectional view showing the instrument of FIG. 1 with the actuating shaft rotated clockwise 90°.

Arms 31 are pivotally mounted on a shaft 32, with an arm for each marker wheel, the shaft 32 being carried in the frame 21. The lowest order arm 33 extends above the shaft 32 and is coupled to a bracket 34 on the frame by a spring 35 (FIG. 1). A cam 36 is carried by the gear 18 and engages the arm 33 to move the arm counterclockwise from the position of FIGS. 1 and 2 and return once per revolution of the gear 18. A wide dog 41 is pivotally mounted on a pin 45 at the lower end of each of the arms 31, with a spring 46 engaging the arm and dog urging the dog clockwise as viewed in FIGS. 1 and 5.

A narrow dog 40 is pivotally mounted on the shaft 32 adjacent each of the arms 31 for engaging the corresponding ten-notched disc 28, with a spring 47 around the shaft 32 engaging the dog 40 urging the dog 40 clockwise as viewed in FIGS. 1 and 5 and with the arm and dogs co-operating to advance the corresponding marker wheel one-tenth of a revolution for each oscillation cycle of the arm, with the wide dog 41 functioning as the driving dog and the narrow dog 40 functioning as the holding dog of the ratchet drive. As indicated previously, the lowest order arm is driven from the cam 36. Each of the higher order arms includes a wide dog 41 positioned between each pair of adjacent wheels engaging both the single-notched disc 29 of one wheel and the ten-notched disc of the next higher order wheel. When a lower order wheel completes a full revolution, the wide dog 41 riding on its single-notched disc 29 will drop into the notch of the disc and at the same time drop into a notch of the ten-notched disc 28 of the next higher order wheel. Then the next movement of the lower order wheel will also advance the higher order wheel. By this mechanism, the calculator accumulates the consumption measured by the meter and is always ready to print out the total as indicated by the position of the marker wheels.

Means are provided for resetting the calculator to the initial condition, usually the zero indication. An axial slot 50 is provided to engage a spring loaded dog 51 carried on each of the marker wheels. During the metering operation, the wheels are advanced clockwise as viewed in FIG. 5 and the dogs easily ride up out of the slot. During the reset operation, the sleeve 26 is rotated clockwise as viewed in FIG. 5 through 360° to pick up each dog and advance all of the wheels to the desired setting.

The cover 13 may be provided with a slot 54 which normally is closed by a slot door 55. In operation, the slot door is moved exposing the slot for insertion of a record card 56 into the recorder. Typically, the door 55 is formed integral as a portion of a card receiver 57 mounted in the frame 21 for movement toward and away from the marker wheels. The card receiver 57 may include pins 58 which ride in slots 59 in the frame (FIG. 4) as well as slots 60 which ride on a shaft 61 journalled in the frame (FIGS. 1 and 4). The card 56 when inserted into the card receiver 57 rests on a platen 64 which provides a suitable surface for pressing the card against the indicia of the marker wheels. For a printing recorder, the platen may be an inked pad of conventional form. Alternatively, for a punching recorder, the platen may be a resilient body for receiving the punch indicia after penetration of the card. A single copy or multiple copies may be prepared as desired.

Figure 8:
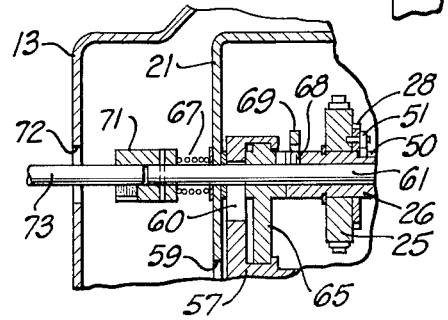
FIG. 8 is a partial sectional view taken along the line 4—4 of FIG. 4 with the actuating shaft in the zero rotation position of FIG. 1 and translated to the resetting position.

The card receiver is raised and lowered by rotation of the shaft 61. Eccentric cams 65, 66 are mounted in mating cam surfaces of the card receiver and are journalled on the shaft 61. The shaft 61 is slidable relative to the cams 65, 66, the sleeve 26 and the frame 21, the shaft being spring loaded to the left as viewed in FIG. 3 by spring 67. When in this left or normal position, pins 68 of the shaft engage mating notches of the cams 65, 66 for rotation of the cams by the shaft. When the shaft 61 is moved to the right as seen in FIG. 8, the pins 68 are moved out of engagement with the cams and the left pin 68 engages a mating notch in the sleeve 26 for rotation of the sleeve with the shaft. A pivoting dog 69 (FIGS. 2, 7 and 8) normally engages the notch in the sleeve 26 for keeping the sleeve in its neutral position regardless of motion of the shaft and the marker wheels. Movement of the shaft to the right brings the pin 68 into contact with the chamfered corner of the dog 69 (FIG. 8) and pushes the dog 69 out of engagement with the sleeve permitting rotation of the sleeve relative to the frame.

A pin 70 on the cam 65 engages a stop on the card receiver 57 (FIG. 1) to limit the counterclockwise rotation of the cam and indicate the zero rotation position of the shaft. A key receiving block 71 is carried at one end of the shaft 61 in line with a key opening 72 in the cover.

The recorder is shown in its normal condition in FIG. 1 with the marker wheels of the calculator being advanced as the disc 14 of the meter rotates. In the preferred form of the invention, the gearing of the device will be selected so that the output of the calculator is directly in dollars and cents based on the quantity of energy consumed and the dollar cost per unit of energy.

On the billing date, the meter reader inserts his key 73 through the opening 72 and into the block 71. The key is then rotated clockwise about 20° moving the card receiver 57 upward and uncovering the card slot 54 in the cover. The card 56 is then inserted into the card receiver and the key is turned clockwise to the position shown in FIGS. 2, 3 and 4 with the card pressed against the marker wheel indicia to print or otherwise mark the calculator output on the card. The key direction of rotation is reversed, the card is withdrawn, the door covers the slot and key motion is stopped by engagement of the pin 70 with the stop. The key is then pushed in, sliding the shaft 61 to the right to the position shown in FIG. 8 with the shaft out of engagement with the cams 65, 66 and in engagement with the sleeve 26. The key and shaft are rotated clockwise through 360° to pick up the reset dogs 51 and reset the marker wheels to the initial condition. Pressure on the key is then relaxed, permitting the spring 67 to move the shaft outward and engage the cams, and the key is removed.

After the charge has been printed on the card, the customer may forward the card to the company with the necessary payment. In an alternative mode of operation, the record may be made on the card by the company's meter reader, after which the customer is billed. While reference has been made herein to a record card, it should be kept in mind that any type of recording medium may be utilized and the word "card" is intended to cover various known forms.

While the invention has been illustrated herein as being totally enclosed in a cover, the marker wheels may also be provided with visual indicia for viewing through a suitable opening in the cover. In another variation, a second calculator may be operated in conjunction with the calculator described, with the second calculator not being reset to provide a continuous record of consumption. Alternatively, a second calculator may be used to calculate in watt hours or other units and/or may be used to make a record of consumption or of continuous billing on the same card and simultaneously with the printing of the monthly bill.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a recorder for a meter having an output shaft, the combination of:
   a frame;
   a counter mechanism mounted in said frame and including means for engaging said output shaft, a plurality of card markers, means for advancing said markers from a reference condition as a function of output shaft motion, and means for resetting said markers to said reference condition;
   a card receiver mounted in said frame for motion toward and away from said markers and including a cam surface;
   an actuating shaft mounted in said frame for rotation and translation;
   first cam means slidably mounted on said shaft and engaging said cam surface of said card receiver;
   second cam means slidably mounted on said shaft and engageable with said resetting means of said counter mechanism; and
   means for selectively engaging said shaft with said first cam means and with said second cam means for selective rotation of said first and second cam means by rotation of said shaft to drive said card receiver by said resetting means respectively, whereby said recorder is actuated by rotating said shaft while engaging said first cam means to move a card on said card receiver into contact with said markers, sliding said shaft to disengage said first cam means and to engage said second cam means, and rotating said shaft while engaging said second cam means to reset said markers.

2. In a recorder for a meter having an output shaft, the combination of:
   a frame;
   a counter mechanism mounted in said frame and including means for engaging said output shaft, a plurality of card markers, means for advancing said markers from a reference condition as a function of output shaft motion, and means for resetting said markers to said reference condition;
   a card receiver mounted in said frame for motion toward and away from said markers and including a cam surface;
   an actuating shaft mounted in said frame for rotation and translation;
   first cam means slidably mounted on said shaft and engaging said cam surface of said card receiver;
   second cam means comprising a sleeve slidably mounted on said shaft and engageable with said resetting means of said counter mechanism, with said markers rotatably mounted on said sleeve;
   deflectable keeper means normally engaged with said sleeve for limiting rotation of said sleeve relative to said markers; and
   means for selectively engaging said shaft with said first cam means and with said second cam means for selective rotation of said first and second cam means by rotation of said shaft to drive said card receiver and said resetting means respectively, whereby said recorder is actuated by rotating said shaft while engaging said first cam means to move a card on said card receiver into contact with said markers, sliding said shaft to disengage said first cam means and to engage said second cam means, and rotating said shaft while engaging said second cam means to reset said markers, with said selectively engaging means deflecting said keeper means out of engagement with said sleeve when said shaft is slid to engage said second cam means.

3. In a recorder for a meter having an output shaft and a cover with a card receiving slot, the combination of:
   a frame;
   a counter mechanism mounted in said frame and including means for engaging said output shaft, a plurality of card markers, means for advancing said markers from a reference condition as a function of output shaft motion, and means for resetting said markers to said reference condition;
   a card receiver mounted in said frame for motion toward and away from said markers and including a cam surface, a platen and a slot door disposed at said cover slot;
   an actuating shaft mounted in said frame for rotation and translation;
   first cam means slidably mounted on said shaft and engaging said cam surface of said card receiver;
   second cam means comprising a sleeve slidably mounted on said shaft and engageable with said resetting means of said counter mechanism, with said markers rotatably mounted on said sleeve;
   deflectable keeper means normally engaged with said sleeve for limiting rotation of said sleeve relative to said markers; and
   means for selectively engaging said shaft with said first cam means and with said second cam means for selective rotation of said first and second cam means by rotation of said shaft to drive said card receiver and said resetting means respectively, whereby said recorder is actuated by rotating said shaft through a first angle while engaging said first cam means to move said slot door away from said slot, inserting a card through said slot onto said platen, rotating said shaft through a further angle to move the platen and card thereon into contact with said markers, sliding said shaft to disengage said first cam means and to engage said second cam means, and rotating said shaft while engaging said second cam means to reset said markers.

References Cited by the Examiner

UNITED STATES PATENTS

| 946,755 | 1/1910 | Golden | 346—98 X |
|---|---|---|---|
| 2,086,363 | 7/1937 | McMullen. | |
| 2,425,072 | 8/1947 | Pearson | 346/98 X |
| 2,539,368 | 1/1951 | Hoye | 235/144 X |
| 2,612,428 | 9/1952 | Vroom | 346—94 X |
| 2,688,445 | 9/1954 | Bowers | 235—144 X |
| 2,714,049 | 7/1955 | Germann | 346—95 |
| 2,966,301 | 12/1960 | Fowlie | 235—114 X |
| 3,139,027 | 6/1964 | Norman | 235—139 |
| 3,152,754 | 10/1964 | Rapisarda | 235—58 |

FOREIGN PATENTS 320,014  10/1929  Great Britain.

LEO SMILOW, *Primary Examiner.*

UNITED STATES PATENT OFFICE
CERTIFICATE OF CORRECTION

Patent No. 3,219,269                           November 23, 1965

William M. Poschman II

It is hereby certified that error appears in the above numbered patent requiring correction and that the said Letters Patent should read as corrected below.

Column 5, line 38, for "by" read -- and --.

Signed and sealed this 4th day of October 1966.

(SEAL)
Attest:

ERNEST W. SWIDER                             EDWARD J. BRENNER
Attesting Officer                                Commissioner of Patents